3,658,778
PROCESS FOR THE PREPARATION OF VINYL-
IDENE CHLORIDE-VINYL CHLORIDE CO-
POLYMERS
Yasushi Toyoda, Kunizo Kido, and Hidetora Kashio,
Iwaki-shi, Japan, assignors to Kureha Kagaku Kogyo
Kabushiki Kaisha, Tokyo, Japan
No Drawing. Filed Dec. 29, 1969, Ser. No. 888,836
Claims priority, application Japan, Dec. 28, 1968,
43/1,008
Int. Cl. C08f 1/88, 15/08
U.S. Cl. 260—87.7
16 Claims

ABSTRACT OF THE DISCLOSURE

Process for the suspension polymerization of vinylidene chloride and vinyl chloride in the presence of a peroxydicarbonate initiator comprising the addition to the polymerization system, at the completion of polymerization, a thiodipropionic acid alkyl ester or a mixture of a thiodipropionic acid alkyl ester and butylhydroxyanisole. The process provides odorless vinylidene chloride-vinyl chloride copolymers.

BACKGROUND OF THE INVENTION (1) Field of the invention

The present invention relates to a process for the preparation of an odorless vinylidene chloride-vinyl chloride copolymer for vinylidene chloride copolymer films.

(2) Description of the prior art

Vinylidene chloride-vinyl chloride copolymers generally consist of 60–90% by weight vinylidene chloride and 10–40% by weight vinyl chloride and are mainly employed as fibers and packaging films or casings for foods. Food packaging materials are required to be odorless and innocuous in addition to having high strength. Should the packaging film possess an odor, that odor, may be transferred to the materials packaged in the film, thus spoiling the quality and/or value of the packaged materials.

As a result of investigations of the odor of films prepared from vinylidene chloride-vinyl chloride copolymers, it has been discovered that the odor originates from the assistants or additives used in the preparation of the films, such as plasticizers, stabilizers and the like. However, some films in which the aforesaid difficulties caused by the presence of additives have been overcome still give a bad odor, and it has further been found that such odor originates in the copolymer itself from which the film has been prepared.

The odors originating in the copolymer are that of hydrochloric acid, caused by the thermal decomposition of the copolymer, that of phosgene, caused by the oxidation of the remaining monomers, that caused by the remaining initiator or the decomposition products of the initiator, and mixtures of these odors. Accordingly, in order to prepare odorless films, it is necessary to remove completely the above causes.

Applicants have investigated the improvement of the thermal stability of said copolymers, removing remaining monomers, improving the additives to be incorporated in the copolymer, etc. to obtain odorless package films and have discovered that these odors originate in the initiator. Thus, as the result of detailed investigation of initiators for the copolymerization of vinylidene chloride and vinyl chloride, it has been found that an odorless copolymer of vinylidene chloride and vinyl chloride and, hence, an odorless film, can be obtained according to the process of the present invention.

SUMMARY OF THE INVENTION

Thus, according to the process of the present invention, a mixture of vinylidene chloride and vinyl chloride is subjected to suspension polymerization in the presence of a peroxydicarbonate-type initiator and after completion of the polymerization reaction, a thiodipropionic acid alkyl ester or a mixture of a thiodipropionic acid alkyl ester and butylhydroxyanisole is added to completely decompose the initiator, whereby the initiator is converted into decomposition products thereof which are harmless to the copolymer. The film prepared from a mixture of the copolymer thus obtained and a small proportion of additives such as a plasticizer by, for example, an inflation method, is completely odorless.

DETAILED DESCRIPTION OF THE INVENTION

A suspension polymerization product is in general superior in thermal stability to an emulsion polymerization product. However, as a considerable amount of an oil-soluble initiator is used in suspension polymerization, the odor of the remaining initiator or the odor of the decomposition product of the initiator inevitably remains, although the odor of hydrochloric acid caused by the decomposition of the polymer is less. In general, the initiator remains partially after the end of polymerization and, in order to completely decompose the remaining initiator, the polymer-monomer mixture must be heated. However, as vinylidene chloride-vinyl chloride copolymer is lacking in high thermal stability, the copolymer is decomposed when it is heated to completely decompose the initiator, which results in the odor.

Therefore, in order to remove the odor caused by the remaining initiator, it is preferable to decompose the initiator by adding a catalytic decomposing agent after the polymerization step. When the initiator is immediately decomposed after polymerization, the low molecular weight decomposition product mainly caused by the initiator can be removed by water washing, evaporating or volatilizing by drying to provide a copolymer having much less odor.

Various initiators may be used as the oil-soluble initiator, but among them, the peroxydicarbonate type initiator has, in particular, a shoft half-decay period and a high decomposition rate. The initiator has the effect of increasing the rate of polymerization.

The inventors have found that a thiodipropionic acid alkyl ester has the property of decomposing the peroxydicarbonate-type initiator quite quickly, as will be illustrated in the following Table 1. Moreover, it has also been found that the thiodipropionic acid alkyl ester only slightly decomposes an acyl peroxide such as lauroyl peroxide as shown in Table 2.

Therefore, in the case of using lauroyl peroxide as the initiator, the thiodipropionic acid alkyl ester is ineffective as the decomposing agent thereof and it is then impossible to remove the odor of the initiator by using such ester.

In the following table, the results on the decomposition rate of 4-chlorobutyl peroxydicarbonate are shown. The experiment was conducted at 30° C. in isopropyl alcohol using 0.00066 mol/liter of 4-chlorobutyl peroxydicarbonate.

TABLE 1

| Decomposing agent | Amount of remaining initiator after— | | |
|---|---|---|---|
| | 0 hr., percent | 1 hr., percent | 2 hrs., percent |
| None | 100 | 98 | 97 |
| DLTDP | 100 | 11.6 | 2.6 |
| DSTDP | 100 | 13.4 | 3.0 |

NOTE.—Amount of the decomposing agent used was 0.00066 mol/liter; DLTDP=dilauryl thiodiproprionate; DSTDP=distearyl thiodipropionate.

In the following table are shown the results on the decomposition rate of various initiators by dilauryl thiodipropionate in toluene at 30° C. using 0.00066 mol/liter of each catalyst.

TABLE 2

| Initiator | DLTDP | Amount of remaining initiator after— | | |
|---|---|---|---|---|
| | | 0 hr., percent | 1 hr., percent | 2 hrs., percent |
| Lauroyl peroxide | None | 100 | 100 | 100 |
| | 0.00066 mol/l | 100 | 100 | 99 |
| Acetyl peroxide | None | 100 | 100 | 99 |
| | 0.00066 mol/l | 100 | 97 | 96 |
| Diisopropyl peroxydicarbonate | None | 100 | 100 | 99 |
| | 0.00066 mol/l | 100 | 15.8 | 5.1 |
| 4-chlorobutyl peroxydicarbonate | None | 100 | 100 | 100 |
| | 0.00066 mol/l | 100 | 11.6 | 2.6 |

As mentioned above, by using the thiodipropionic acid ester alone, the peroxydicarbonate can be rapidly decomposed and hence markedly reduces the odor of the copolymer. However, the inventors have further discovered that the use of a butylhydroxyanisole represented by the formula

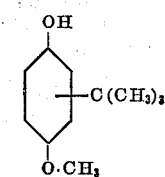

together with the thiopropionic acid ester, further reduces the odor of the copolymer of vinylidene chloride and vinyl chloride having substantially no odor can be obtained. The reason is believed to be as follows. The radicals formed from the decomposed initiator attack the copolymer resulting in its decomposition, react with oxygen, or react with the decomposition products, whereby very complex materials are formed, which may cause some odor, even if it is weak. On the other hand, it is believed that a butylhydroxyanisole added to the polymerized system immediately reacts with these radicals to render them harmless to the properties of the copolymer, whereby it contributes to remove the odor of the copolymer.

In general, there are so-called radical scavengers or radical chain terminating agents which immediately react with radicals and, as such materials, there are known phenols and amines. However, they have the disadvantage that they impart color to the copolymers, they are poisonous, or they give a strong odor themselves and hence, only certain phenols are used for the copolymerization of vinylidene chloride and vinyl chloride.

The inventors have found that among these phenols, butylhydroxyanisole is very effective for removing the odor of copolymers when the anisole is used together with the thiodipropionic acid alkyl ester.

The precise reason why butylhydroxyanisole is particularly effective for removing the odor of the copolymer has not yet been clearly determined, but a comparison of the polymerization terminating power of the anisole with those of general phenol compounds in the copolymerization of vinylidene chloride and vinyl chloride is shown in Table 3.

In this experiment, a mixture of 20 parts by weight of vinyl chloride, 80 parts by weight of vinylidene chloride and 0.14 part by weight of isopropyl peroxydicarbonate was subjected to a suspension polymerization of 39° C. After 20 hours, the phenolic compound shown in Table 3 was added to the polymerization system under pressure and, after continuing the polymerization for 43 hours, the polymerization was stopped by adding lauryl thiodipropionate. The yield of copolymer prepared was compared in each case and a larger yield represents a lower polymerization terminating power.

TABLE 3

| Compound | Amount | Yield, percent |
|---|---|---|
| Control sample* | | 50.0 |
| Butylhydroxyanisole | 6.8 x 10 mols | 50.0 |
| Propyl gallate | 6.8 x 10 mols | 79.0 |
| 2,6-ter-butyl-4-methylphenol | 6.8 x 10 mols | 72.0 |

*Control sample (the polymerization was stopped by adding dilauryl thiodipropionate after 20 hrs.).

From the above results, it will be understood that butylhydroxyanisole has quite a high polymerization stopping power and also 2,6-di-tert-butyl-4-methylphenol, which is known as a good polymerization terminating agent in general, is almost ineffective in the copolymerization of vinylidene chloride and vinyl chloride. However, even if 2,6-di-tert-butyl-4-methylphenol is employed together with the thiodipropionic acid ester in the copolymerization of vinylidene chloride and vinyl chloride, the aforesaid weak odor of the copolymerization product is not removed. Thus it is considered that the radical scavenging action of butylhydroxyanisole is effective for the removal of odor.

It is necessary to add the thiodipropionic acid alkyl ester or a mixture of the thiodipropionic acid alkyl ester and butylhydroxyanisole to the polymerization system after the polymerization has reached a desired state of completion. After the polymerization is finished, remaining monomers are generally recovered from the polymerization product by heating and hence, if the aforesaid additive or additives are not added to the system in such case, the polymerization of the remaining monomers proceeds to provide low molecular weight polymers having low thermal stability or the radicals of the initiator violently attack, at a high temperature, the copolymer formed to degrade its thermal stability, which causes the generation of odor. Accordingly, it is necessary to completely decompose the initiator by adding to the copolymerization system the thiodipropionic acid alkyl ester or a mixture of the thiodipropionic acid alkyl ester and butylhydroxyanisole after the end of polymerization, whereby the initiator is converted into the decomposition product harmless to the copolymer, and thereafter recover vinylidene chloride by heating the system, whereby the odorless copolymer of vinylidene chloride and vinyl chloride can be prepared.

In addition, the addition of butylhydroxyanisol alone to the polymerization system cannot provide an odorless copolymer even if the amount of the antisole is increased. This shows that the peroxide decomposing agent is very effective for removing the odor of the copolymer, as mentioned above.

As mentioned above, by using the thiodipropionic acid alkyl ester or a mixture of the thiodipropionic acid alkyl ester and butylhydroxyanisole in the case of copolymerizing vinylidene chloride and vinyl chloride, an odorless copolymer and odorless films can be prepared and, moreover, these two additives are generally recognized as safe by the Food and Drug Administration in the U.S.A. Thus, according to the process of the present invention, odorless and innocuous copolymer films can be prepared and used suitably as package films for foods.

The polymerization initiators used in the copolymerization of vinylidene chloride and vinyl chloride are well known peroxydicarbonate type initiators represented by the following general formula:

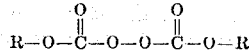

wherein R represents an alkyl group having 2–10 carbon atoms, a halogenated alkyl group having 2–10 carbon atoms, an alkoxyalkyl group (said alkoxyl group having 2–8 carbon atoms and said alkyl group having 2–10 carbon atoms), a cyclohexyl group, or a substituted cyclohexyl group (substituted by, e.g., an alkyl group having 1-4 carbon atoms).

Examples of the peroxydicarbonates are ethyl, n-propyl, n-butyl, iso-butyl, 4-chlorobutyl, butoxyethyl, cyclohexyl, and 4-tert-butylcyclohexyl peroxydicarbonates.

The thiodipropionic acid alkyl ester, especially thiodipropionic acid dialkyl ester, used in the present invention is a compound represented by the general formula

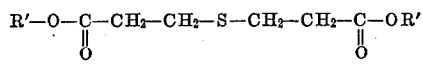

wherein R' represents an alkyl group having 10-18 carbon atoms and the typical examples of these esters are lauryl thiodipropionate and stearyl thiodipropionate.

Butylhydroxyanisole is represented by the formula

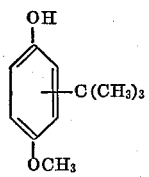

The group —$C(CH_3)_3$ in the above formula is positioned at the 2-position or the 3-position. Therefore, as the anisole there are 2-tertbutyl-4-methoxyphenol and 3-tertbutyl-4-methoxyphenol and they may be used alone or as a mixture thereof.

The suspension polymerization of vinylidene chloride and vinyl chloride (60-90% by weight vinylidene chloride and 10-40% by weight vinyl chloride) using the peroxydicarbonate initiator may be generally carried out by the method disclosed in the specification of British Pat. No. 1,040,826 or 1,111,087. The amount of the peroxydicarbonate initiator is 0.01-0.3 parts by weight to 100 parts by weight of the monomers to be employed in the copolymerization (in the examples below, the amount of the remaining initiator is less than 1% by weight of the amount of the initiator employed).

It is desirable that the aforesaid thiodipropionic acid alkyl ester or mixture of the thiodipropionic acid alkyl ester and the butylhydroxyanisole is added as a solution to the system at the end of the polymerization. Solvents which are odorless, dissolve the above two compounds, and are readily absorbed on the particles of the remaining monomers and polymers may be employed as the solvent for the solution of the compounds, but usually a vinylidene chloride monomer is most preferable. The solution of the additive or additives is preferably added to the system, as a matter of course, at the time when the polymerization reaches a desired conversion level. That is, since the additive or additives are readily mixed with the initiator after the undesirable post-polymerization of the monomers is stopped or when the monomer remains in the system, it is desirable that the solution of the additive or additives is added, generally under pressure, to the system just after the polymerization reaches a desirable conversion. Further for sufficiently mixing, it is desirable to stir the system.

If the temperature at which the solution is added to the system is too low, the decomposition procedure for the initiator must be conducted for a longer period of time and hence the addition temperature is generally 0-100° C., preferably 15-70° C. The higher temperature is preferable for decomposing the initiator in a short period of time, but usually, by conducting the decomposition at a temperature higher than 30° C. for about 30 minutes, the copolymer having no odor can usually be obtained.

If the amount of the thiodipropionic acid alkyl ester is too small, the addition thereof is clearly ineffective. The amount necessary generally depends on the amount of the remaining initiator, but upon consideration of the amount of the initiator usually left, the effective amount of the thiodipropionic acid alkyl ester is 0.005-0.5 part by weight per 100 parts by weight of the monomers. Furthermore, in the case of employing the thiodipropionic acid alkyl ester and butylhydroxyanisole, 1-100 parts by weight of butylhydroxyanisole is employed per 10 parts by weight of the thiodipropionic acid alkyl ester and, in particular, it is preferable that more than an equivalent amount of butylhydroxyanisole is used to the thiodipropionic acid alkyl ester. If the amounts of the thiodipropionic acid alkyl ester and butylhydroxyanisole are less than the aforesaid value, the effect of the present invention becomes insufficient, while if they are higher than the value, no further effect is improved, which makes the use of such large amounts of the additives uneconomical. Further, if an amount of the thiodipropionic acid alkyl ester too large is used, it may impart its own odor to the copolymer, and if too large an amount of butylhydroxyanisole is used, the copolymer prepared may be colored.

The invention will further be explained by the following illustrative examples.

EXAMPLE 1

Into a 100 liter stainless steel autoclave was charged an aqueous solution of 80 g. of methyl cellulose in 40 liters of distilled water, and after purging the autoclave with nitrogen gas, 16 kg. of vinylidene chloride containing 40 g. of n-butyl peroxydicarbonate and 4 kg. of vinyl chloride were dispersed in the aqueous solution and the system was subjected to copolymerization with stirring.

After 40 hours, a solution of 16 g. of dilauryl thiodipropionate in 160 g. of vinylidene chloride was added to the system at 50° C. followed by stirring for about 30 minutes, whereby the polymerization was stopped. Thereafter, the polymerized slurry was heated to 80° C. to recover the monomer and separate the copolymer thus prepared. Thus, an odorless copolymer of vinylidene chloride and vinyl chloride was obtained with a yield of 83%.

The polymer prepared was mixed with 5 g. of dibutyl sebacate and 2 g. of butylphthalyl butyl glycolate and a film having a thickness of 5/100 mm. was formed by means of inflation molding at 180° C. The film had almost no odor.

On the other hand, the same procedure as above was repeated except that the unreacted monomer was removed by heating without adding dilauryl thiodipropionate to prepare a control copolymer of vinylidene chloride and vinyl chloride. A film prepared from the copolymer by the same procedure as above possessed the specific odor of hydrochloric acid, the odor of the initiator, and the odor of the decomposition products of the initiator.

EXAMPLE 2

Into a 10 liter autoclave was charged 4 liters of deionized water containing 0.1% by weight methyl cellulose. After sufficiently purging the autoclave with a nitrogen gas, 1.5 kg. of vinylidene chloride containing 0.15% by weight of 4-chlorobutyl peroxydicarbonate and 0.4 kg. of vinyl chloride were added to the autoclave and the copolymerization was conducted by raising the temperature of the reaction system gradually from 36° C. to 54° C. over a 50 hour period. After 50 hours, a solution of 1.6 g. of distearyl thiodipropionate in 16 g. of vinylidene chloride was pressed in the autoclave and the product mixture was stirred at 54° C. for 30 minutes. The yield of copolymer after the 50 hour polymerization was 83% and $\eta_{sp}/c$. of the copolymer was 0.59.

A film prepared from the copolymer by the same procedure as in Example 1 gave almost no odor.

EXAMPLE 3

The same procedure as in Example 1 was followed to prepare a copolymer of vinylidene chloride and vinyl chloride with the exception that 30 g. of diisopropyl peroxydicarbonate was used as the initiator instead of n-butyl peroxydicarbonate. After 42 hours, a solution of 8 g. of butylhydroxyanisole and 7 g. of distearyl thiodipropionate in 100 g. of vinylidene chloride was pressed in the autoclave and the product was stirred at 50° C. for 30 minutes. Thereafter, by heating the slurry of the product to 80° C., the unreacted monomer was recovered and the copolymer was separated. Thus, a copolymer of vinylidene chloride and vinyl chloride having no odor was obtained with a yield of 81%.

The copolymer obtained was mixed with 5 g. of dibutyl sebacate and 2 g. of butylphthalyl butyl glycolate and from the mixture a film of 5/100 mm. in thickness was prepared by means of an inflation molding at 180° C. The film had almost no odor. Further, the film was put in a glass bottle and sealed. After being heated at a temperature of 60° C., the seal was immediately removed and the film still gave almost no odor.

However, the same procedure as above was repeated with the exception that the copolymerization was stopped by adding 16 g. of butylhydroxyanisole without adding distearyl thiodipropionate. A film prepared from the copolymer as above had the odor of the initiator and the odor of the decomposition product of the initiator.

EXAMPLE 4

Into a 10 liter autoclave was charged 4 liters of deionized water containing 0.1% by weight methyl cellulose. After sufficiently purging the autoclave with a nitrogen gas, 1.5 g. of vinylidene chloride containing 0.13% by weight butoxyethyl peroxide and 0.5 kg. of vinyl chloride were added into the autoclave and then the temperature of the system was gradually increased from 32° C. to 50° C. After 80 hours, a solution of 0.6 g. of butylhydroxyanisole and 0.5 g. of dilauryl thiodipropionate in 10 g. of vinylidene chloride was pressed in the autoclave and thereafter the system was stirred at 50° C. for 30 minutes. Thereafter, by heating the product slurry to 80° C., the unreacted monomer was recovered and the copolymer was separated. The yield of copolymer after the 80 hour polymerization was 75%, and $\eta_{sp}/c$. of the copolymer was 0.55. The copolymer was mixed with 4 g. of dibutyl sebacate and 2 g. of butylphthalyl butyl glycolate and from the mixture a film of 5/100 mm. in thickness was prepared by means of an inflation molding at 180° C. When the film was bottled and heated to 60° C., the film gave almost no odor.

What is claimed is:

1. A process for the preparation of a vinylidene chloride-vinyl chloride copolymer which comprises carrying out the suspension polymerization of vinylidene chloride and vinyl chloride using as the polymerization initiator a peroxydicarbonate initiator, said peroxydicarbonate initiator being a compound represented by the general formula:

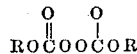

wherein R represents a member selected from the group consisting of an alkyl group having 2–10 carbon atoms, a halogenated alkyl group having 2–10 carbon atoms, an alkoxyalkyl group, said alkoxyl group thereof having 2–8 carbon atoms and said alkyl group thereof having 2–10 carbon atoms, a cyclohexyl group and a substituted cyclohexyl group, and adding, after the polymerization reaction reaches a desired conversion level, a member selected from the group consisting of a thiodipropionic acid alkyl ester and a mixture of a thiodipropionic acid alkyl ester and butylhydroxyanisole to the product mixture to decompose the remaining initiator, said thiodipropionic acid alkyl ester being a compound represented by the general formula:

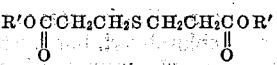

wherein R' represents an alkyl group having 10–18 carbon atoms, the proportion of said thiodipropionic acid alkyl ester added being 0.005–0.5 parts by weight per 100 parts by weight of vinylidene chloride and vinyl chloride.

2. The process as claimed in claim 1 wherein the monomer mixture to be copolymerized consists of 60–90% by weight vinylidene chloride and 10–40% by weight vinyl chloride.

3. The process as claimed in claim 1 wherein said thiodipropionic acid alkyl ester is selected from the group consisting of lauryl thiodipropionate and stearyl thiodipropionate.

4. The process as claimed in claim 1 wherein the remaining initiator is decomposed by heating.

5. The process as claimed in claim 4 wherein the temperature of decomposing the remaining initiator by adding the thiodipropionic acid alkyl ester is 0–100° C.

6. The process as claimed in claim 4 wherein the temperature of decomposing the remaining initiator by adding the thiodipropionic acid alkyl ester is 15–70° C.

7. The process as claimed in claim 1 wherein said peroxydicarbonate type initiator is selected from the group consisting of 4-chlorobutyl peroxydicarbonate and diisopropyl peroxydicarbonate.

8. The process of claim 1 wherein the decomposed initiator is removed.

9. The process of claim 8 wherein the amount of peroxydicarbonate initiator is 0.01–0.3 part by weight per 100 parts by weight of the monomers employed in the copolymerization.

10. The process of claim 8 wherein from 1 to 100 parts by weight of butylhydroxyanisole is added per 10 parts by weight of said thiodipropionic acid alkyl ester.

11. The process of claim 1 wherein said butylhydroxyanisole is 2-tertbutyl-4-methoxyphenol.

12. The process of claim 1 wherein said butylhydroxyanisole is 3-tertbutyl-4-methoxyphenol.

13. The process of claim 1 wherein said peroxydicarbonate is selected from the group consisting of ethyl, n-propyl-, n-butyl, isobutyl-, 4-chlorobutyl-, butoxyethyl-, cyclohexyl-, and 4-tert-butylcyclohexyl peroxydicarbonates.

14. The process of claim 1 wherein said thiodipropionic acid alkyl ester or a mixture of a thiodipropionic acid alkyl ester and butylhydroxyanisole are added to the product mixture in a solvent.

15. The process of claim 14 wherein said solvent is vinylidene chloride monomer.

16. The process for the preparation of a vinylidene chloride-vinyl chloride copolymer which comprises carrying out the suspension polymerization of vinylidene chloride and vinyl chloride at a ratio of 60 to 90% by weight vinylidene chloride and 10 to 40% by weight vinyl chloride using as the polymerization initiator a peroxydicarbonate initiator, said peroxydicarbonate initiator being a compound represented by the general formula:

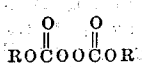

wherein R represents a member selected from the group consisting of an alkyl group of from 2 to 10 carbon atoms, a halogenated alkyl group of from 2 to 10 carbon atoms, an alkoxyalkyl group, said alkoxy group thereof having from 2 to 8 carbon atoms and said alkyl group thereof having from 2 to 10 carbon atoms, a cyclohexyl group and a substituted cyclohexyl group, and adding, after the polymerization reaction reaches a desired conversion level, from 0.005 to 0.5 part by weight per 100 parts by weight of vinylidene chloride and vinyl chloride of a thiodipropionic acid alkyl ester selected from the group consisting of lauryl thiodipropionate and stearyl thiodipropionate, or a mixture of said thiodipropionic acid alkyl ester and butylhydroxyanisole to the product mixture to decompose the remaining initiator, the amount of said butylhydroxyanisole being from 1 to 100 parts by weight per 10 parts by weight of the thiodipropionic acid alkyl ester, and said decomposition being accomplished by adding the thiodipropionic acid alkyl ester at a temperature of from 0 to 100° C., whereafter the decomposed initiator is removed.

References Cited

FOREIGN PATENTS 1,040,826  9/1966  Great Britain.
1,111,087  4/1968  Great Britain.

JOSEPH L. SCHOFER, Primary Examiner

S. M. LEVIN, Assistant Examiner

U.S. Cl. X.R.

99—171 R; 260—23 XA